US010618493B2

(12) United States Patent
Suzuki

(10) Patent No.: US 10,618,493 B2
(45) Date of Patent: Apr. 14, 2020

(54) AIRBAG DEVICE INCLUDING AN INFLATABLE MEMBER FOLDED ONTO ANOTHER INFLATABLE MEMBER

(71) Applicant: Fuji Jukogyo Kabushiki Kaisha, Tokyo (JP)

(72) Inventor: Mototsugu Suzuki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/352,426

(22) Filed: Nov. 15, 2016

(65) Prior Publication Data
US 2017/0182967 A1 Jun. 29, 2017

(30) Foreign Application Priority Data

Dec. 24, 2015 (JP) ................................. 2015-250925

(51) Int. Cl.
B60R 21/232 (2011.01)
B60R 21/233 (2006.01)
(Continued)

(52) U.S. Cl.
CPC .......... B60R 21/232 (2013.01); B60R 21/213 (2013.01); B60R 21/233 (2013.01);
(Continued)

(58) Field of Classification Search
CPC .................... B60R 21/232; B60R 2021/23386
See application file for complete search history.

(56) References Cited

U.S. PATENT DOCUMENTS 8,967,660 B2 * 3/2015 Taguchi ................ B60R 21/233
280/729
9,108,588 B2 * 8/2015 Fukawatase .......... B60R 21/233
(Continued)

FOREIGN PATENT DOCUMENTS

JP 2008-001197 A 1/2008
JP 2010-036795 A 2/2010
(Continued)

OTHER PUBLICATIONS

Japanese Office Action dated Jul. 25, 2017 in Japanese Application No. 2015-250925 with an English translation thereof.
(Continued)

Primary Examiner — Barry Gooden, Jr.
(74) Attorney, Agent, or Firm — McGinn I.P. Law Group, PLLC.

(57) ABSTRACT

An airbag device includes a curtain bag body and a tag. The curtain bag body extends from a front pillar of a vehicle so as to run along a roof side rail of the vehicle. The curtain bag body is secured with the tag to the front pillar and the roof side rail. The curtain bag body includes a first region having a first inflatable member disposed below the roof side rail and a second region having a second inflatable member that is in communication with the first inflatable member and that is disposed closer to the front pillar than the first inflatable member. The second region is folded back in such a manner that part of the second inflatable member overlaps the first inflatable member in the vehicle-width direction of the vehicle and is secured to the front pillar with the tag.

17 Claims, 7 Drawing Sheets

(51) Int. Cl.
  *B60R 21/213*    (2011.01)
  *B60R 21/2338*   (2011.01)
  *B60R 21/237*    (2006.01)

(52) U.S. Cl.
  CPC ........ *B60R 21/2338* (2013.01); *B60R 21/237* (2013.01); *B60R 2021/23382* (2013.01); *B60R 2021/23386* (2013.01)

(56) References Cited

U.S. PATENT DOCUMENTS

| | | | |
|---|---|---|---|
| 9,469,269 B2* | 10/2016 | Hiruta | B60R 21/232 |
| 2008/0129023 A1 | 6/2008 | Heigl et al. | |
| 2009/0058049 A1* | 3/2009 | Villarreal | B60R 21/232 |
| | | | 280/728.2 |
| 2010/0032930 A1* | 2/2010 | Yamamura | B60R 21/232 |
| | | | 280/730.2 |
| 2010/0225097 A1 | 9/2010 | Trovato et al. | |
| 2011/0079990 A1* | 4/2011 | Cheal | B60R 21/213 |
| | | | 280/730.2 |
| 2013/0270805 A1* | 10/2013 | Kruse | B60R 21/232 |
| | | | 280/730.2 |
| 2014/0042732 A1 | 2/2014 | Taguchi et al. | |
| 2014/0217709 A1* | 8/2014 | Fukawatase | B60R 21/232 |
| | | | 280/730.2 |
| 2014/0217710 A1 | 8/2014 | Fukawatase et al. | |
| 2014/0265268 A1* | 9/2014 | Wang | B60R 21/232 |
| | | | 280/729 |
| 2015/0115581 A1* | 4/2015 | Mazanek | B60R 21/232 |
| | | | 280/730.2 |
| 2015/0307057 A1* | 10/2015 | Moon | B60R 21/232 |
| | | | 280/728.2 |
| 2016/0107602 A1 | 4/2016 | Nakashima | |

FOREIGN PATENT DOCUMENTS

| | | |
|---|---|---|
| JP | 2010-202187 A | 9/2010 |
| JP | 2014-037159 A | 2/2014 |
| JP | 2014-151734 A | 8/2014 |
| WO | WO 2014/188922 A1 | 11/2014 |

OTHER PUBLICATIONS

Chinese Office Action, dated Jan. 16, 2019, in Chinese Application No. 201610952154. X and Partial English Translation thereof.

* cited by examiner

AIRBAG DEVICE INCLUDING AN INFLATABLE MEMBER FOLDED ONTO ANOTHER INFLATABLE MEMBER

CROSS-REFERENCE TO RELATED APPLICATIONS

The present application claims priority from Japanese Patent Application No. 2015-250925 filed on Dec. 24, 2015, the entire contents of which are hereby incorporated by reference.

BACKGROUND

1. Technical Field

The present invention relates to an airbag device mounted on an automobile or other vehicle and, more particularly, to an airbag device that can prevent a reduction in a driver's field of vision resulting from an enlarged front pillar and can be applied to protection against an oblique collision.

2. Related Art

Vehicles provided with curtain airbags for protecting occupants' heads in the event of a collision or other emergency situation have recently been in widespread use. The typical curtain airbag device houses a curtain airbag in a section of the vehicle ranging from a front pillar trim inner member to a roof trim inner member and, in the event of a vehicle collision or other emergency situation, deploys the curtain airbag along the side window glass, thereby protecting the occupants' heads.

In some countries, protection against passenger ejection from a vehicle involved in a rollover accident is required under law. The curtain airbag device is effective for such protection. The shapes of curtain airbag devices for protecting occupants' heads are disclosed in Japanese Unexamined Patent Application Publications (JP-A) Nos. 2010-36795 and 2010-202187.

First, FIG. 6A illustrates a state in which an airbag 42 of a head protection airbag device 41 is inflated and deployed. The airbag 42 is provided with a protective member 43 that covers the inboard side of a window and a supplementary inflatable member 44 that is inflated adjacent to the inboard side of the protective member 43 at a lower part that constitutes a lower end 43A of the protective member 43. The airbag device 42 is a rectangular-shaped component having the supplementary inflatable member 44 disposed along a long side (extending in the longitudinal direction of the vehicle) thereof.

FIG. 6B is a view of a section taken along VIB-VIB of the airbag 42 of FIG. 6A. The supplementary inflatable member 44 is folded back in such a manner that an upper end 44A thereof is inflated and deployed toward the upper part of the vehicle. With this arrangement, the occupant's head is prevented from sliding to a position lower than the lower-end position of the window (for instance, see JP-A No. 2010-36795).

Next, FIG. 7A illustrates a state in which a curtain airbag 52 of a side curtain airbag module 51 is inflated and deployed. The curtain airbag 52 includes a main chamber 53 having a plurality of inflatable members and a front chamber 54 that is disposed in front of the main chamber 53. One end of a tether 55 is secured to an end of the curtain airbag 52, while the other end is secured to an A pillar 56. With this arrangement, the front chamber 54 is inflated and deployed so as to cover the inboard side of the tether 55.

FIG. 7B illustrates a state in which the curtain airbag 52 is folded and housed in the A pillar 56 and a roof rail 57. The front chamber 54 is folded back toward the main chamber 53. Then, with both of the chambers 53, 54 overlapping each other, the curtain airbag 52 is folded up in the shape of a "Z" or an accordion (for instance, see JP-A No. 2010-202187).

Typical measures required for an airbag to successfully cope with an oblique collision include enlargement of the airbag. However, the use of a larger airbag base cloth requires an increased inflator output, which may raise an issue concerning an enlarged inflator device and a reduced passenger compartment volume. In addition, the larger airbag base cloth and the enlarged inflator device may raise another issue concerning an increase in cost.

The airbag 42 of the head protection airbag device 41 disclosed in JP-A No. 2010-36795 has a protective member 43 and a supplementary inflatable member 44 disposed at the lower end 43A of the protective member 43. In addition, the supplementary inflatable member 44 is disposed along the long side of the airbag 42.

In order to protect the heads of the driver and the occupant seated in the front passenger seat against an impact resulting from, for instance, an oblique collision, the airbag 42 should be disposed so as to extend toward the front section of the vehicle as much as possible. If this occurs, the use of an enlarged base cloth for the airbag 42 may raise an issue concerning a reduced passenger compartment volume and an increase in cost.

In addition, while the airbag 42 is folded and housed in the roof rail, the protective member 43 and the supplementary inflatable member 44 are disposed so as to overlap each other and extend to an area of the airbag 42 close to the front section of the vehicle. As a result, the airbag 42 becomes thick when folded.

Due to the thick folded airbag 42 extending up to the A pillar, the A pillar becomes thick or enlarged. This arrangement protects the heads of the driver and the occupant seated in the front passenger seat more reliably, but the A pillar is likely to obstruct the driver's field of vision, which may raise another issue concerning driving safety deterioration.

In the side curtain airbag module 51 disclosed in JP-A No. 2010-202187, the curtain airbag 52 includes the main chamber 53 and the front chamber 54 disposed in front of the main chamber 53.

However, due to the structure in which the front chamber 54 is folded back toward the main chamber 53 and is then folded and housed together with the main chamber 53, a region where both the chambers 53, 54 overlap each other becomes thick. Such an overlapping region is disposed at a leading end of the curtain airbag 52 and is housed in the A pillar 56. As a result, the A pillar 56 becomes thick or enlarged and is likely to obstruct the driver's field of vision, which may raise another issue concerning driving safety deterioration.

In addition, the main chamber 53 and the front chamber 54 are disposed in a row in the longitudinal direction of the vehicle and a recessed region 58 is formed at a leading end of the main chamber 53 above the front chamber 54. This arrangement may cause a concern that the heads of the driver and the occupant seated in the front passenger seat are put into the recessed region 58 and are given yaw rotation in the event of an oblique collision.

SUMMARY OF THE INVENTION

It is desirable to provide an airbag device that can prevent a reduction in the driver's field of vision resulting from an enlarged front pillar and can be applied to protection against an oblique collision.

A first aspect of the present invention provides an airbag device that includes a curtain bag body that extends from a front pillar of a vehicle so as to run along a roof side rail of the vehicle and a tag with which the curtain bag body is secured to the front pillar and the roof side rail. The curtain bag body includes a first region having a first inflatable member disposed below the roof side rail and a second region having a second inflatable member that is in communication with the first inflatable member and that is disposed closer to the front pillar than the first inflatable member. The second region is folded back in such a manner that part of the second inflatable member overlaps the first inflatable member in the vehicle-width direction of the vehicle and is secured to the front pillar with the tag.

The curtain bag body may have a region in the middle thereof in which the first region and the second region overlap each other and another region in which the first region and the second region may be disposed independently.

The second region may be folded back toward the inboard side in the vehicle-width direction of the vehicle.

The second region may be folded back toward the outboard side in the vehicle-width direction of the vehicle.

BRIEF DESCRIPTION OF THE DRAWINGS

FIG. 6A is a side view illustrating a state in which the airbag device is inflated and deployed. FIG. 6B is a cross-sectional view taken along line VIA-VIB of FIG. 6A.

FIG. 7A is a side view illustrating a state in which a curtain member is inflated and deployed. FIG. 7B is a side view illustrating a state in which the curtain member is housed.

DETAILED DESCRIPTION

An airbag device according to a first example of the present invention will be described below in detail with reference to the attached drawings.

Figure 1:
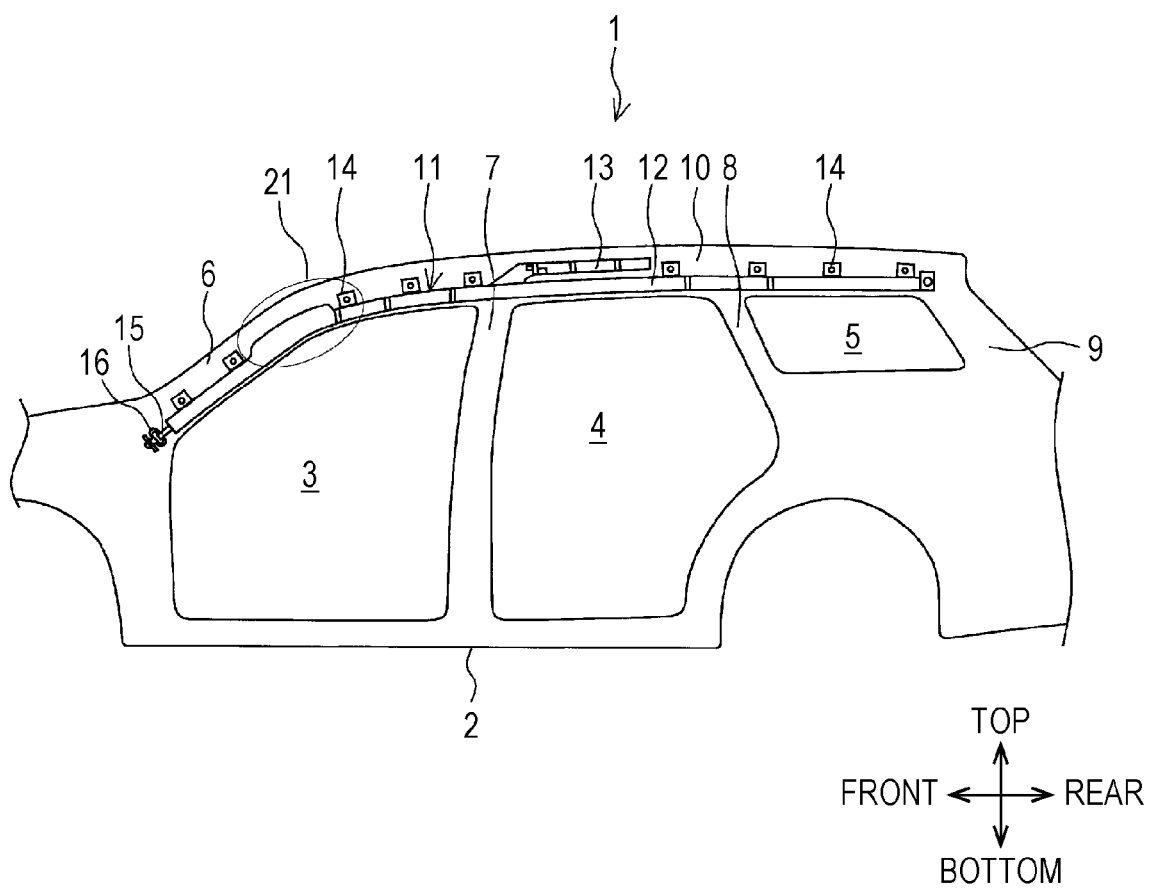
FIG. 1 is a side view of a mounting structure for an airbag device according to a first example of the present invention, schematically illustrating a state in which the airbag is mounted in a vehicle.
Figure 2A:
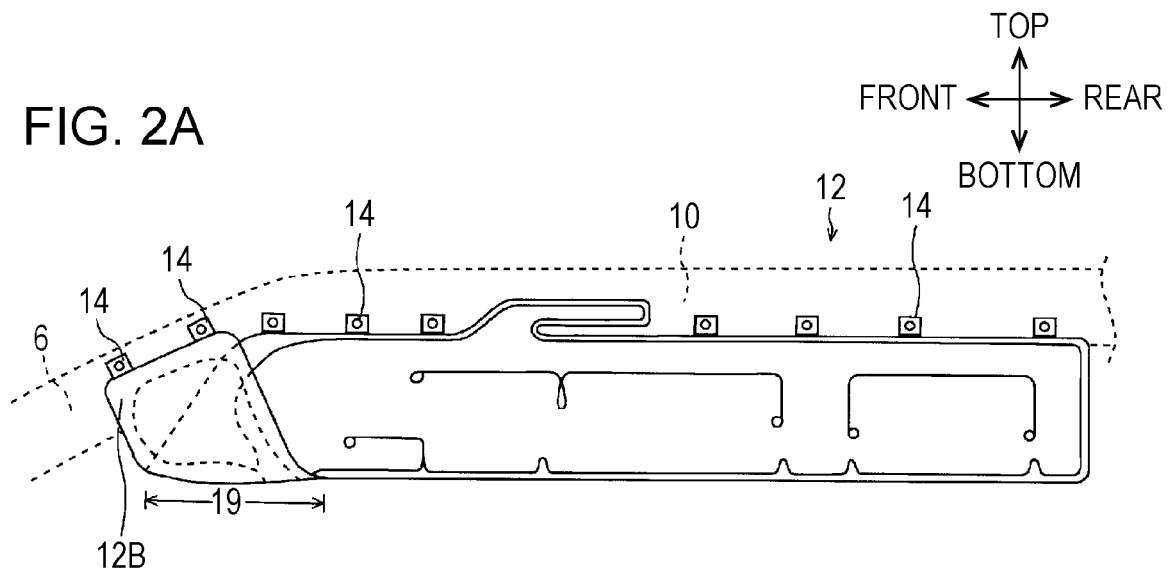
FIG. 2A is a side view illustrating a state in which the airbag device according to the first example of the present invention is inflated and deployed.
Figure 2B:
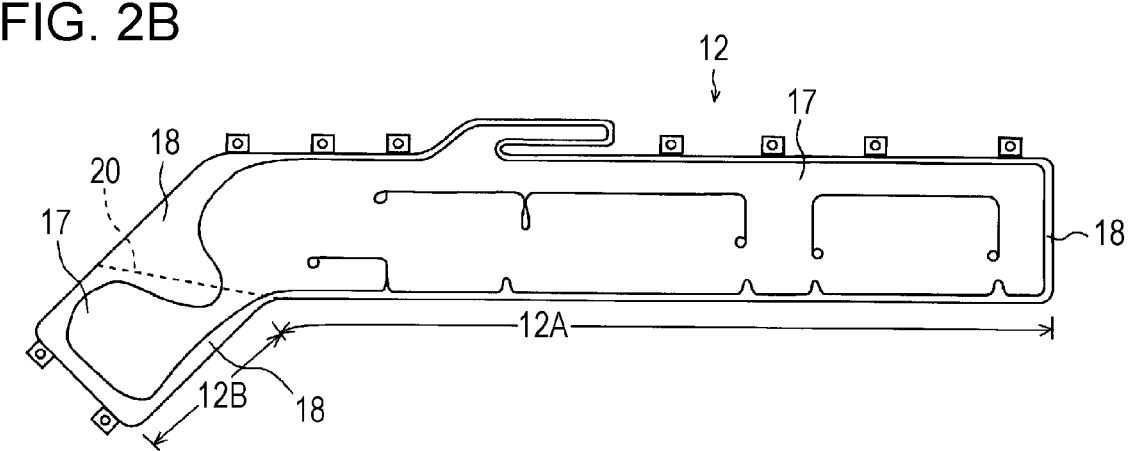
FIG. 2B is a side view illustrating a state in which a curtain bag body illustrated in FIG. 2A is deployed before installed in a vehicle.
Figure 2C:
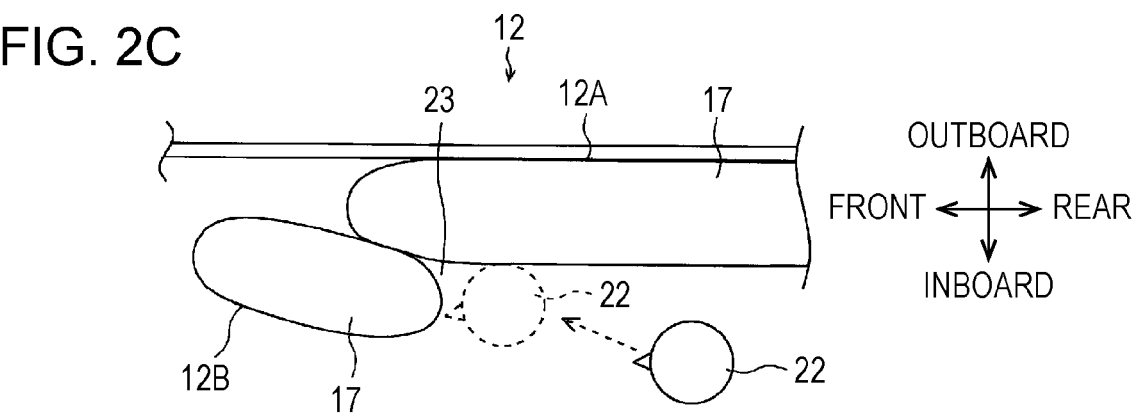
FIG. 2C is a top view illustrating a state in which the airbag device is inflated and deployed in a driver's seat.

FIG. 1 is a side view, as seen from the inboard side of the passenger compartment of a vehicle, schematically illustrating a mounting structure for the airbag device. FIG. 2A is a side view, as seen from the inboard side of the passenger compartment, illustrating a state in which a curtain bag body is inflated and deployed. FIG. 2B is a side view illustrating a state in which a curtain bag body illustrated in FIG. 2A is deployed before being installed in the vehicle. FIG. 2C is a top view illustrating a state in which the curtain bag body is inflated and deployed in the driver's seat of the vehicle.

As illustrated in FIG. 1, a vehicle 1 according to this example is, for instance, a wagon-type vehicle that is provided with three rows of seats in the longitudinal direction thereof and has a front door opening 3 corresponding a first row of seats, a rear door opening 4 corresponding to a second row of seats and a window opening 5 corresponding to a third row of seats, all of which are provided at a vehicle body side wall 2. The vehicle 1 is not limited to a vehicle provided with three rows of seats and may include a vehicle provided with two rows of seats.

The vehicle body side wall 2 is provided with, from the front to rear of the vehicle 1, a front pillar 6 (hereinafter referred to as "A pillar 6"), a center pillar 7 (hereinafter referred to as "B pillar 7"), a quarter pillar 8 (hereinafter referred to as "C pillar 8"), and a rear pillar 9 (hereinafter referred to as "D pillar 9), all of which are coupled at upper areas thereof to a roof side rail 10 extending in the longitudinal direction of the vehicle 1.

An airbag device 11 includes a curtain bag body 12, an inflator 13 that supplies gas to the curtain bag body 12, retaining tags 14 with which the curtain bag body 12 in a folded and housed state is mounted on the vehicle body side wall 2, and a strap 15 that restricts the movement of the curtain bag body 12.

The curtain bag body 12 is a fabric component that, when inflated and deployed, is substantially rectangular-shaped with its long side extending in the longitudinal direction of the vehicle 1 and that is typically held in a folded state in which the curtain bag body 12 is vertically wound to form a thin roll. The curtain bag body 12 is disposed along the A pillar 6 and the roof side rail 10 and is secured to the vehicle body side wall 2 with the retaining tags 14 therebetween. In addition, the curtain bag body 12 is provided with a gas introduction member and is in communication with the inflator 13 secured to the roof side rail 10 through the gas introduction member.

The curtain bag body 12 is not limited to a roll type and may include a bellows type, or may be a combination of the roll and bellows types.

If the vehicle 1 is subjected to an oblique collision or suffers a rollover accident or other emergency situation, the airbag device 11 causes the inflator 13 to eject a high-pressure gas into the curtain bag body 12 that is then deployed in the shape of a curtain between the vehicle body side wall 2 and an occupant's head, thereby protecting the occupant's head.

The strap 15 that is, for instance, a string-like fabric component is disposed so as to pass through a ring-like area of a bracket 16 bolted to the A pillar 6 and is coupled to a member of the curtain bag body 12 that is close to a front section of the vehicle 1. During inflation and deployment of the curtain bag body 12, the strap 15 imposes restrictions so as to maintain a state in which the curtain bag body 12 is twisted at an area thereof close to the front section of the vehicle 1.

FIG. 2A illustrates a state in which the curtain bag body 12 is inflated and deployed. The curtain bag body 12 is a substantially rectangular-shaped bag body with its long side extending in the longitudinal direction of the vehicle 1 and has a substantially L-shaped front end close to the front section of the vehicle 1, the front end being slanted obliquely downward. In addition, the curtain airbag body 12 has a linear section that is disposed in a region extending along the roof side rail 10 and that is secured to the roof side rail 10 with the plurality of retaining tags 14.

Furthermore, the curtain bag body 12 has a slanted area that is folded back from the inboard side of the passenger compartment toward the upper part of the vehicle 1 and that is secured to the A pillar 6 with the two retaining tags 14 disposed at ends thereof. In other words, the curtain bag body 12 is disposed in the vehicle 1 so as to be twisted at a area thereof close to the front section of the vehicle 1.

FIG. 2B illustrates a state in which the curtain bag body 12 is deployed before being installed in the vehicle 1. The curtain bag body 12 includes an inflatable member 17 that is deployed by the gas introduced from the inflator 13 (see FIG. 1) and a non-inflatable member 18 that is not inflated due to no gas introduction. The non-inflatable member 18 is disposed at a circumferential end of the curtain bag body 12 so as to surround the inflatable member 17.

The curtain bag body 12 has a main cell region 12A mainly disposed below the roof side rail 10 and a sub-cell region 12B that is mainly disposed in front of the main cell region 12A so as to be located below the A pillar 6.

The main cell region 12A and the sub-cell region 12B, as a unit, have the inflatable member 17 extending thereacross and have part of the non-inflatable member 18 bulging downward from the upper end of the curtain bag body 12 at a boundary region therebetween, making part of the inflatable member 17 narrower.

A dotted line 20 indicates a line along which the curtain bag body 12 is folded. As illustrated in FIG. 2A, an overlapping region 19 between the main cell region 12A and the sub-cell region 12B includes a narrower overlapping region between one and other areas of the inflatable member 17 and a wider overlapping region between the inflatable member 17 and the non-inflatable member 18.

The non-inflatable member 18 has a smaller base cloth than the inflatable member 17. A wide area of the non-inflatable member 18 disposed in the overlapping region 19 makes folded areas of the curtain bag body 12 thinner, thereby contributing to reduced thicker areas of the curtain bag body 12.

In addition, as illustrated in FIG. 2A, the sub-cell region 12B is disposed independently in front of the overlapping region 19 in the longitudinal direction of the vehicle 1.

With this arrangement, the curtain bag body 12 in the folded state has a larger thickness in the overlapping region 19 and has a smaller thickness in front of and in the rear of the overlapping region 19, thereby contributing to shortened thicker areas compared to the conventional folded structure illustrated in FIGS. 6A, 6B, 7A, and 7B. As indicated by a circle 21 (see FIG. 1), the thickest area of the curtain bag body 12 in the overlapping region 19 is disposed in the roof side rail 10 or in the A pillar 6 so as to be close to the roof side rail 10.

In other words, the thickness of the folded curtain bag body 12 is made smaller in a member of the A pillar 6 that readily comes within the driver's field of vision, preventing an area of the A pillar 6 coming within the driver's field of vision from being enlarged. This means that the A pillar 6 is unlikely to obstruct the driver's field of vision and jeopardize driving safety. Likewise, the A pillar 6 is unlikely to obstruct the field of vision of an occupant seated in a front passenger seat, thereby allowing the occupant to enjoy scenery more from the vehicle window when the vehicle is travelling.

FIG. 2C illustrates the head behavior of an occupant in the driver's seat associated with airbag inflation and deployment. As described above, the curtain bag body 12 is bent toward the inboard side of the passenger compartment at an area thereof close to the front section of the vehicle 1 and is disposed in a twisted state in the vehicle 1. In addition, if the curtain bag body 12 is inflated and deployed in the event of an oblique collision, the sub-cell region 12B is located closer to the inboard side of the passenger compartment than the main cell region 12A.

As illustrated in FIGS. 2A and 2B, the main cell region 12A and the sub-cell region 12B, as a unit, have the inflatable member 17 extending nearly over the entire short side (extending in the vertical direction of the vehicle) of the curtain bag body 12. The main cell region 12A and the sub-cell region 12B come into contact with and overlap each other in the overlapping region 19 in the inboard direction of the passenger compartment. As a result, the curtain bag body 12, while inflated and deployed, has a thicker area thereof close to the front section of the vehicle 1. In addition, the main cell region 12A and the sub-cell region 12B, as a unit, have a pocket region 23 for receiving an occupant's head 22 formed in the overlapping region 19.

With this arrangement, when the occupant's head 22 is moved toward the outboard side of the passenger compartment in the event of an oblique collision, the pocket region 23 can receive and hold the occupant's head 22 with the face of the occupant nearly facing the front. This prevents yaw rotation of the occupant's head 22, ensuring that the occupant's head 22 is protected more reliably.

Next, an airbag device according to a second example of the present invention will be described in detail with reference to the attached drawings.

Figure 3A:
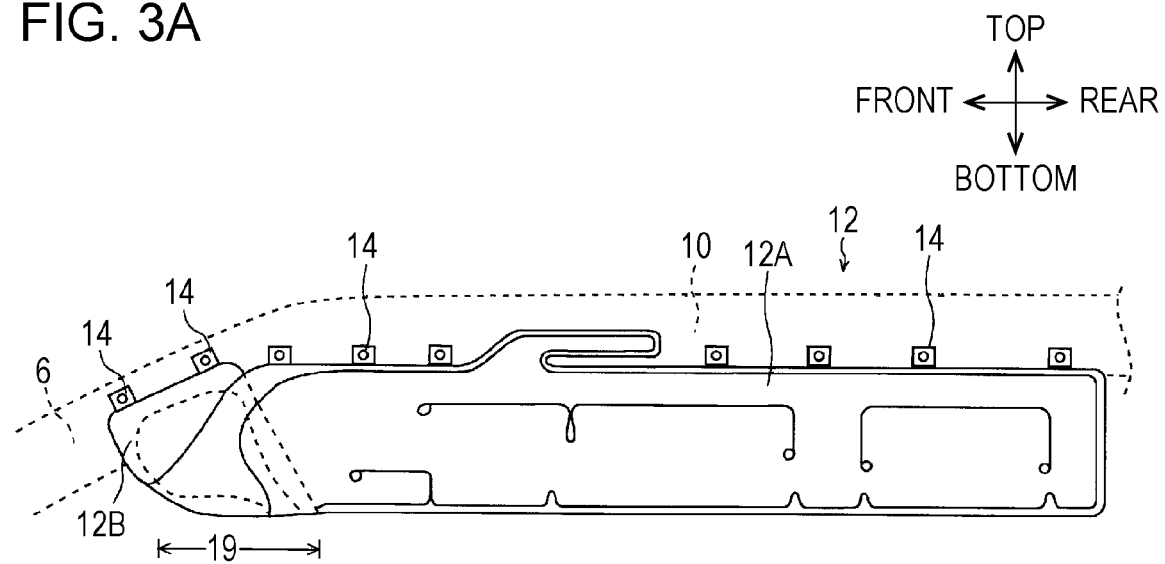
FIG. 3A is a side view illustrating a state in which an airbag device according to a second example of the present invention is inflated and deployed.
Figure 3B:
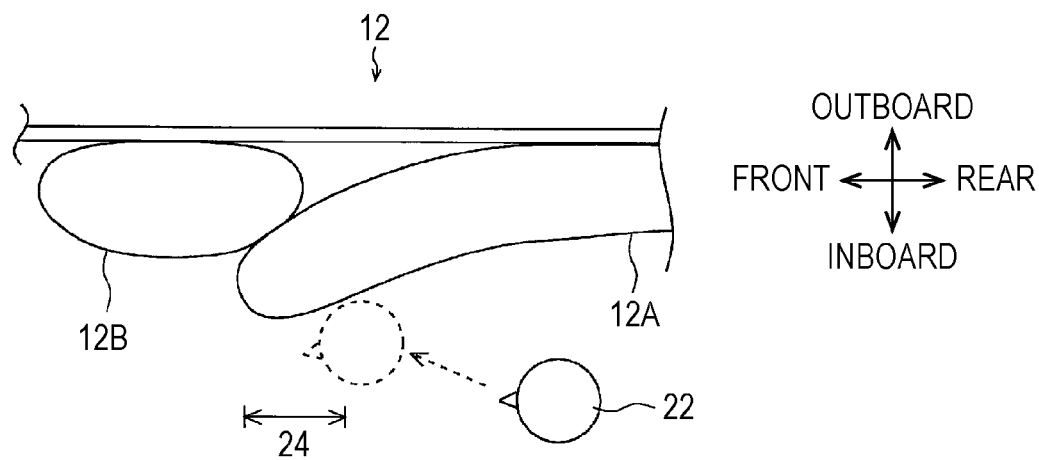
FIG. 3B is a top view illustrating a state in which the airbag device is inflated and deployed in a driver's seat.

FIG. 3A is a side view, as seen from the inboard side of the passenger compartment, illustrating a state in which a curtain bag body is inflated and deployed. FIG. 3B is a top view illustrating a state in which a curtain bag body is inflated and deployed in a driver's seat.

The second example differs from the first example described with reference to FIGS. 1, 2A, 2B, and 2C in that the curtain bag body 12 is bent toward the outboard side of the passenger compartment, but is the same as the first example in terms of the structure of the curtain bag body 12 and other structures. For this reason, the reference numerals and symbols in the second example refer to the same components as those with the same reference numerals and symbols in the first example described with reference to FIGS. 1, 2A, 2B, and 2C, and repeated descriptions of the same components are omitted.

As illustrated in FIG. 3A, in this example, the sub-cell region 12B of the curtain bag body 12 is folded back from the outboard side of the passenger compartment toward the upper part of the vehicle 1 and is secured to the A pillar 6 with the two retaining tags 14 disposed at ends thereof.

As illustrated in FIG. 3B, if the curtain bag body 12 is inflated and deployed in the event of an oblique collision, the sub-cell region 12B is deployed in a twisted state so as to be located closer to the outboard side of the passenger compartment than the main cell region 12A. Note that the curtain bag body 12 according to the second example is effective for a side collision as well since the deploying sub-cell region 12B moves the main cell region 12A toward the inboard side of the passenger compartment.

As illustrated in the drawings, the overlapping region 19 between the main cell region 12A and the sub-cell region 12B is inflated and deployed as an area of the curtain bag body 12 having the largest thickness in the inboard direction of the passenger compartment. In other words, the overlapping region 19 between the main cell region 12A and the sub-cell region 12B is inflated and deployed as a region 24 that bulges the most as the curtain bag body 12 toward the inboard side of the passenger compartment.

With this arrangement, if the occupant's head 22 is moved toward the outboard side of the passenger compartment in the event of an oblique collision, the region 24 where the main cell region 12A and the sub-cell region 12B bulge can receive and hold the occupant's head 22 with the face of the occupant nearly facing the front. This prevents yaw rotation of the occupant's head 22, ensuring that the occupant's head 22 is protected more reliably.

As described in the first example, the thickest area of the curtain bag body 12 in the overlapping region 19 is disposed in the roof side rail 10 or in the A pillar 6 so as to be close to the roof side rail 10 in this example as well. This prevents an area of the A pillar 6 coming within the driver's field of vision from being enlarged, thereby ensuring that that the A pillar 6 is unlikely to obstruct the driver's field of vision and jeopardize driving safety.

Next, an airbag device according to a third example of the present invention will be described in detail with reference to the attached drawings.

Figure 4A:
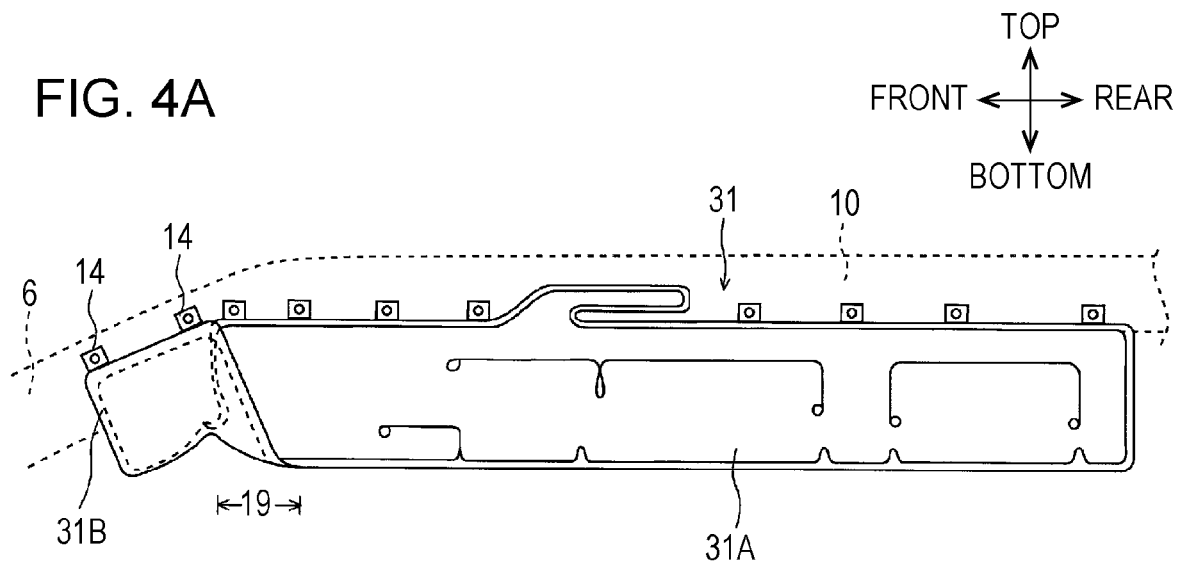
FIG. 4A is a side view illustrating a state in which an airbag device according to a third example of the present invention is inflated and deployed.
Figure 4B:
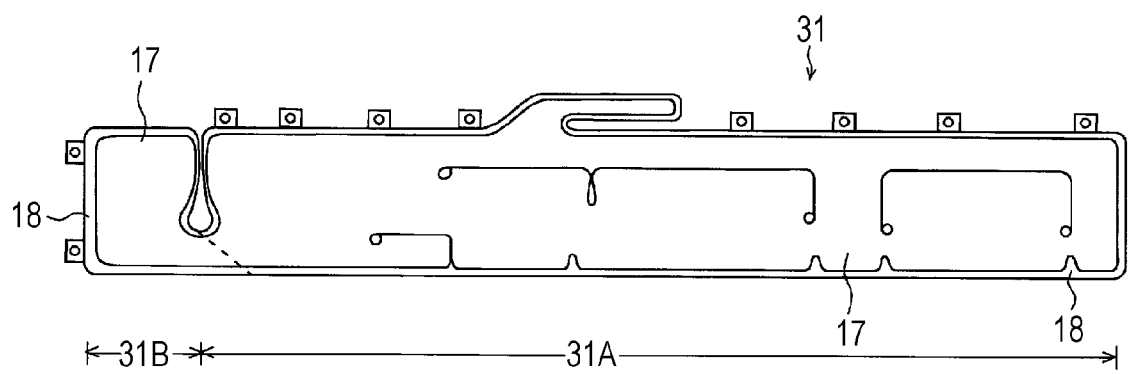
FIG. 4B is a side view illustrating a state in which a curtain bag body illustrated in FIG. 4A is deployed before installed in a vehicle.
Figure 4C:
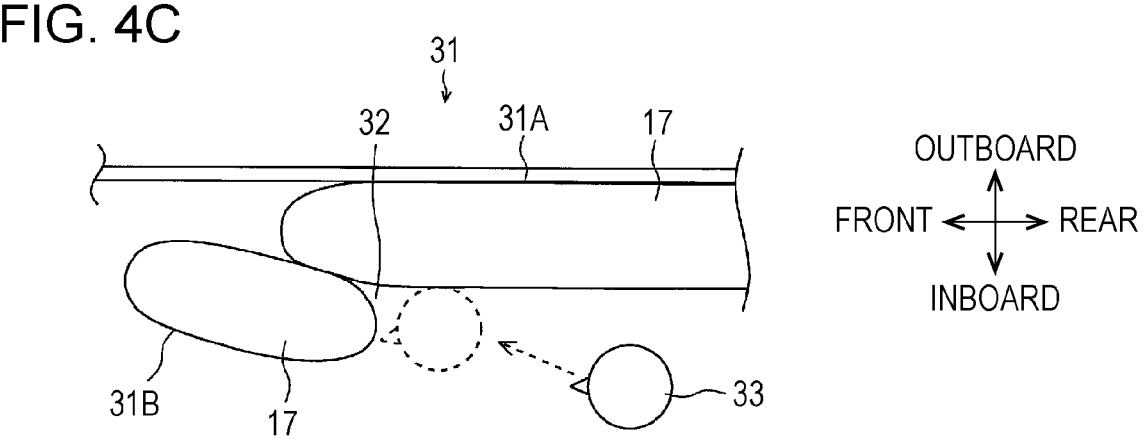
FIG. 4C is a top view illustrating a state in which the airbag device is inflated and deployed in a driver's seat.

FIG. 4A is a side view, as seen from the inboard side of the passenger compartment, illustrating a state in which a curtain bag body is inflated and deployed. FIG. 4B is a side view illustrating a state in which a curtain bag body illustrated in FIG. 4A is deployed before being installed in a vehicle. FIG. 4C is a top view illustrating a state in which the airbag device is inflated and deployed in the driver's seat.

The third example differs from the first example described with reference to FIGS. 1, 2A, 2B, and 2C in that the curtain bag body 12 extends linearly in the longitudinal direction of the vehicle 1, but is the same as the first example in terms of other structures. For this reason, the reference numerals and symbols in the third example refer to the same components as those with the same reference numerals and symbols in the first example described with reference to FIGS. 1, 2A, 2B, and 2C, and repeated descriptions of the same components are omitted.

As illustrated in FIG. 4A, an area of a curtain bag body 13 that is close to the front section of the vehicle 1 is folded back from the inboard side of the passenger compartment toward the upper part of the vehicle 1 and is secured to the A pillar 6 with the two retaining tags 14 disposed at ends thereof. In other words, the curtain bag body 31 is disposed in the vehicle 1 so as to be vertically twisted at an area thereof close to the front section of the vehicle 1.

As illustrated in FIG. 4B, the curtain bag body 31 is a substantially rectangular-shaped bag body with its long side linearly extending in the longitudinal direction of the vehicle 1. The curtain bag body 31 includes an inflatable member 17 that is deployed by the gas introduced from an inflator 13 (see FIG. 1) and a non-inflatable member 18 that is not inflated due to no gas introduction.

The curtain bag body 31 has a main cell region 31A mainly disposed below a roof side rail 10 and a sub-cell region 31B that is mainly disposed in front of the main cell region 31A so as to be located below an A pillar 6.

In a boundary region between the main cell region 31A and the sub-cell region 31B, part of the inflatable member 17 ranging from an upper end nearly to a lower end of the curtain bag body 31 is separated from the curtain bag body 31. As a result, an area of the inflatable member 17 close to the lower end of the curtain bag body 31 is made narrower, through which the inflatable member 17 is communicated.

As illustrated in FIG. 4C, the main cell region 31A and the sub-cell region 31B come into contact with and overlap each other in the overlapping region 19 in the inboard direction of the passenger compartment. As a result, the curtain bag body 31, while inflated and deployed, has a thicker area thereof close to the front section of the vehicle 1. In addition, the main cell region 31A and the sub-cell region 31B, as a unit, have a pocket region 32 for receiving an occupant's head 33 formed in the overlapping region 19.

With this arrangement, when the occupant's head 33 is moved toward the outboard side of the passenger compartment in the event of an oblique collision, the pocket region 32 can receive and hold the occupant's head 33 with the face of the occupant nearly facing the front. This prevents yaw rotation of the occupant's head 33, ensuring that the occupant's head 33 is protected more reliably.

As described in the first example, the thickest area of the curtain bag body 31 in the overlapping region 19 is disposed in the roof side rail 10 or in the A pillar 6 so as to be close to the roof side rail 10 in this example as well. This prevents an area of the A pillar 6 coming within the driver's field of vision from being enlarged, thereby ensuring that that the A pillar 6 is unlikely to obstruct the driver's field of vision and jeopardize driving safety.

Next, an airbag device according to a fourth example of the present invention will be described in detail with reference to the attached drawings.

Figure 5A:
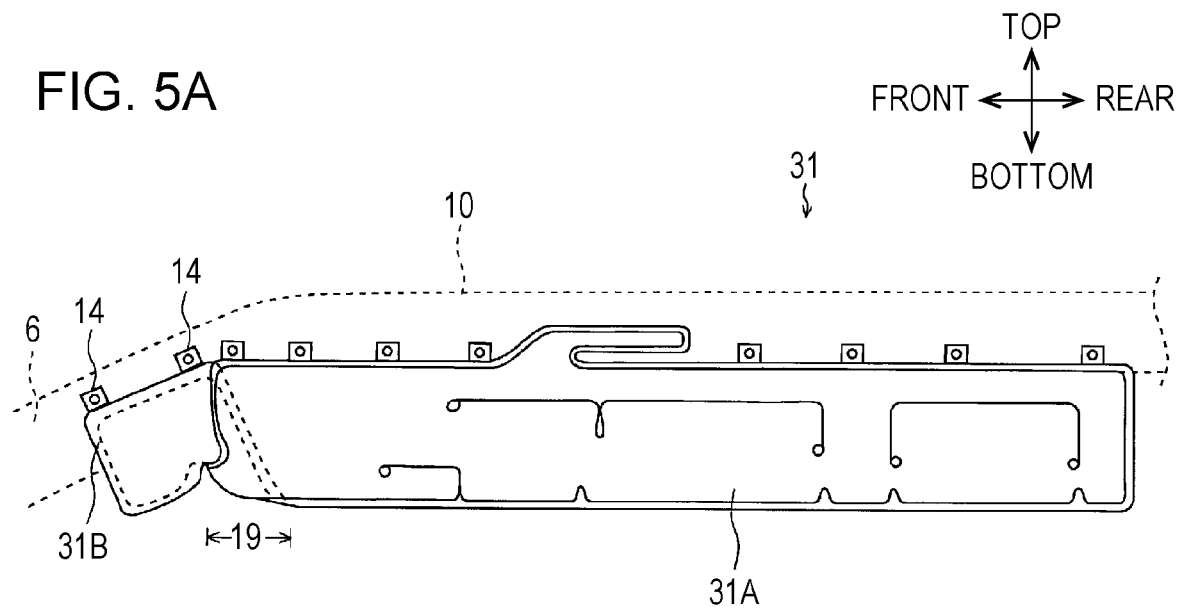
FIG. 5A is a side view illustrating a state in which an airbag device according to a fourth example of the present invention is inflated and deployed.
Figure 5B:
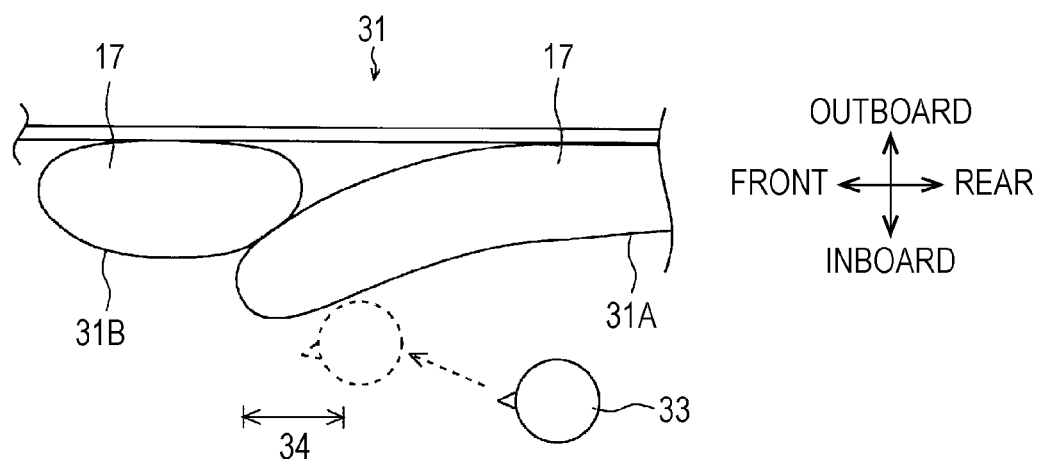
FIG. 5B is a top view illustrating a state in which the airbag device is inflated and deployed in a driver's seat.
Figure 6A:
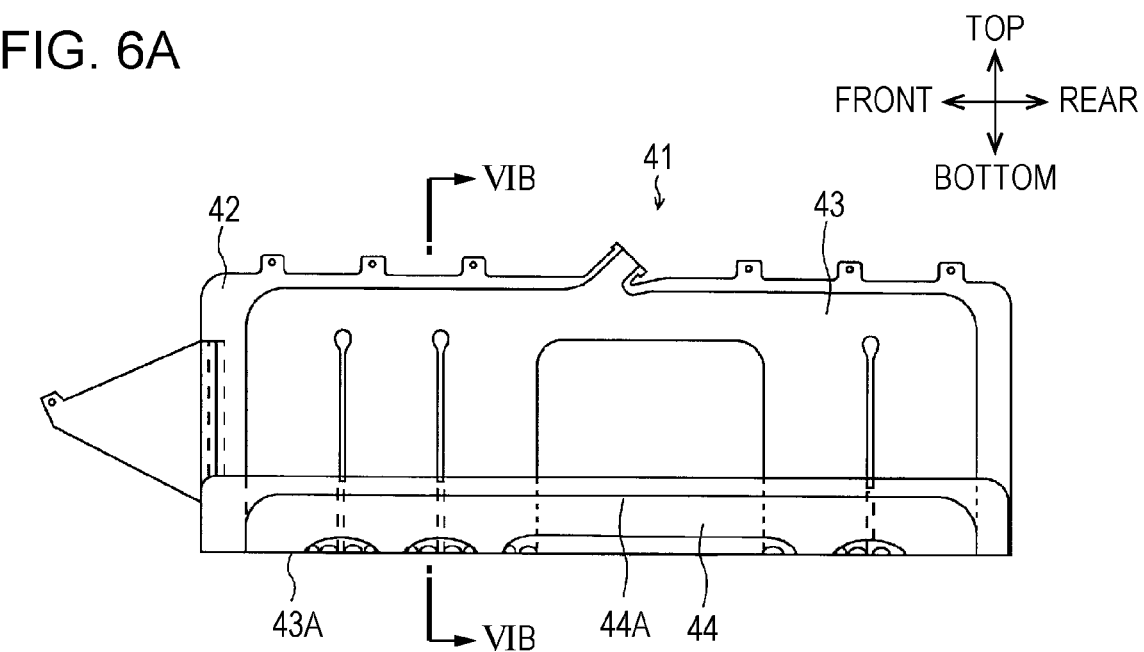
FIGS. 6A and 6B illustrate a conventional airbag device.
Figure 6B:
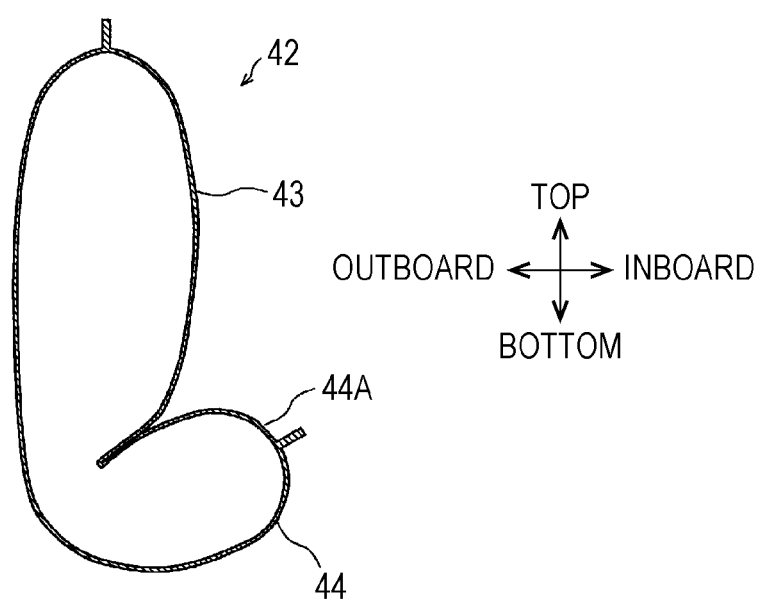
Figure 7A:
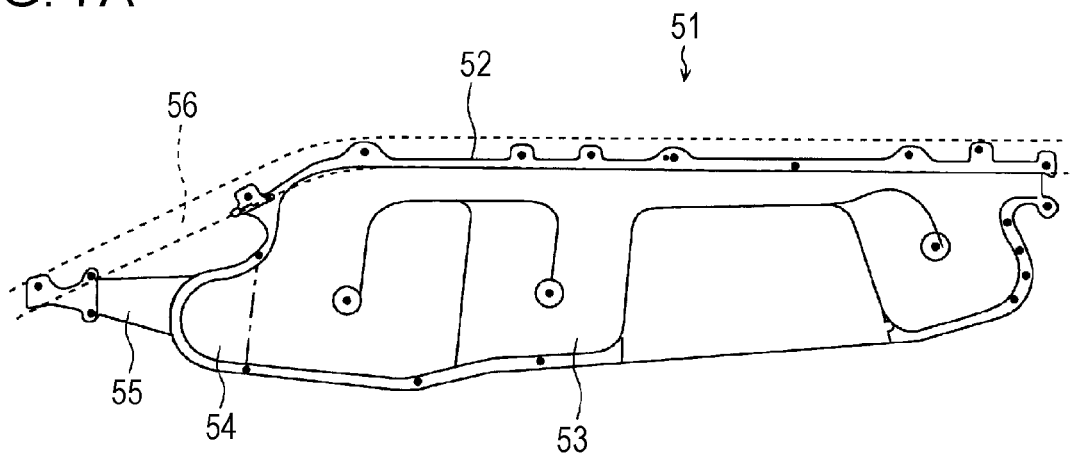
FIGS. 7A and 7B illustrate a conventional airbag device.
Figure 7B:
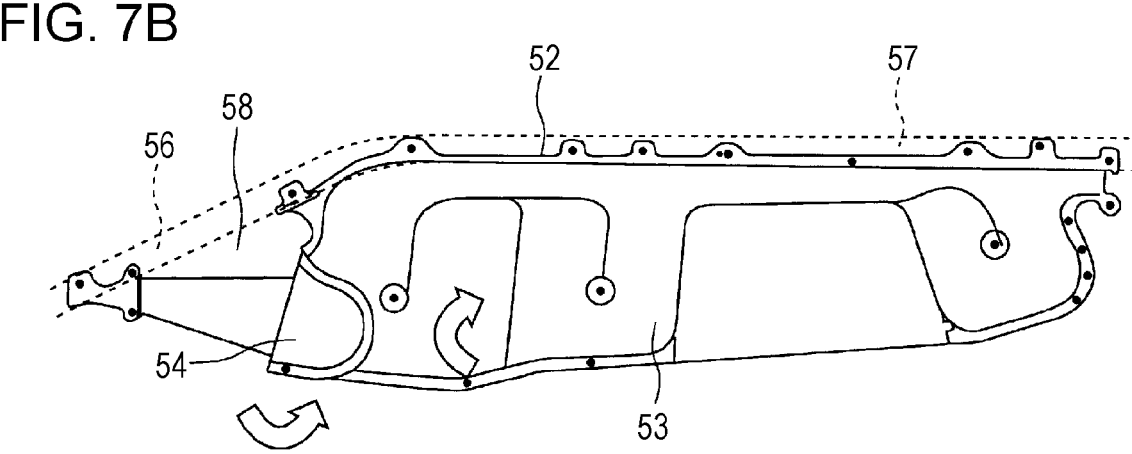

FIG. 5A is a side view, as seen from the inboard side of the passenger compartment, illustrating a state in which a curtain bag body is inflated and deployed. FIG. 5B is a top view illustrating a state in which the airbag device is inflated and deployed in the driver's seat.

The fourth example differs from the third example described with reference to FIG. 4 in that a curtain bag body 31 is bent toward the outboard side of the passenger compartment, but is the same as the first and third examples in other structures. For this reason, the reference numerals and symbols in the fourth example refer to the same components as those with the same reference numerals and symbols in the first and third examples described with reference to FIGS. 1, 2, and 4, and repeated descriptions of the same components are omitted.

As illustrated in FIG. 5A, in this example, the sub-cell region 31B of the curtain bag body 31 is folded back from the outboard side of the passenger compartment toward the upper part of the vehicle 1 and is secured to the A pillar 6 with the two retaining tags 14 disposed at ends thereof.

As illustrated in FIG. 5B, if the curtain bag body 31 is inflated and deployed in the event of an oblique collision, the sub-cell region 31B is deployed in a twisted state so as to be located closer to the outboard side of the passenger compartment than the main cell region 31A.

As illustrated in the drawings, the overlapping region 19 between the main cell region 31A and the sub-cell region 31B is inflated and deployed as an area of the curtain bag body 31 having the largest thickness in the inboard direction of the passenger compartment. In other words, the overlapping region 19 between the main cell region 31A and the sub-cell region 31B is inflated and deployed as a region 34 that bulges the most as the curtain bag body 31 toward the inboard side of the passenger compartment.

With this arrangement, if an occupant's head 33 is moved toward the outboard side of the passenger compartment in the event of an oblique collision, the region 34 where the main cell region 31A and the sub-cell region 31B bulge can receive and hold the occupant's head 33 with the face of the occupant nearly facing the front. This prevents yaw rotation of the occupant's head 33, ensuring that the occupant's head 33 is protected more reliably.

As described in the first and third examples, the thickest area of the curtain bag body 31 in the overlapping region 19 is disposed in the roof side rail 10 or in the A pillar 6 so as to be close to the roof side rail 10 in this example as well. This prevents an area of the A pillar 6 coming within the driver's field of vision from being enlarged, thereby ensuring that the A pillar 6 is unlikely to obstruct the driver's field of vision and jeopardize driving safety.

The present invention is typically described with reference to, but not limited to, the driver's side airbag in the first through fourth examples. The same effect can also be obtained when the present invention is applied to the passenger's side airbag since the passenger's airbag has the same structure as the driver's side airbag. In addition, various modifications are conceivable within the scope of the present invention.

The invention claimed is:

1. An airbag device, comprising:
a curtain bag body that extends from a front pillar of a vehicle so as to run along a roof side rail of the vehicle; and
one or more tags provided on the curtain bag body, and securing the curtain bag body to the front pillar and the roof side rail,
wherein the curtain bag body, in a deployed state where the curtain bag body is spread into a planar shape before installed in the vehicle, is configured to include a first face, a second face opposite to the first face, a first region including a first inflatable member that is disposed between the first face and the second face, and a second region being adjacent to the first region and including a second inflatable member that is in communication with the first inflatable member and that is disposed between the first face and the second face,
wherein the curtain bag body, in an inflated state after installed in the vehicle, is configured to inflate into a folded shape that includes an upper edge where the one or more tags are provided and a lower edge opposed to the upper edge in a view from a vehicle-width direction, and the upper edge and the lower edge extend along at least the roof side rail,
wherein the first region, in the inflated state, is secured to the roof side rail with the one or more tags so that the first face of the first region directs to an inboard direction of the vehicle,
wherein the second region, in the inflated state, is folded back in such a manner that a part of the second inflatable member overlaps the first inflatable member in the vehicle-width direction of the vehicle and is secured to the front pillar with the one or more tags so that an entirety of the second face of the second region directs to the inboard direction,
wherein, in the inflated state, the curtain bag body includes:
an overlapping region where the first region and the second region are overlapped in the vehicle-width direction;
a first independent region that includes only the first region of the first region and the second region, and that is disposed away from the front pillar more than the overlapping region; and
a second independent region that includes only the second region of the first region and the second region, and that is disposed more closely to the front pillar than the overlapping region,
wherein, the view from the vehicle-width direction, the overlapping region of the curtain bag body in the inflated state includes a periphery,
wherein the periphery of the overlapping region includes a boundary of the first region and the second region that is disposed along the lower edge, and a part of a periphery of the second region, and
wherein the part of the periphery of the second region extends from the lower edge to the front pillar.

2. The airbag device according to claim 1, wherein the second region is folded back toward an inboard side in the vehicle-width direction of the vehicle, and
wherein, in the overlapping region, the first face of the first region is in contact with the first face of the second region.

3. The airbag device according to claim 1, wherein the second region is folded back toward an outboard side in the vehicle-width direction of the vehicle, and
wherein, in the overlapping region, the second face of the first region is in contact with the second face of the second region.

4. The airbag device according to claim 1, wherein a longitudinal direction of an extension of the first region is disposed along the roof side rail, and
wherein the second region is inclined toward the front pillar with a non-perpendicular angle with respect to the longitudinal direction.

5. The airbag device according to claim 1, wherein the second region is folded back such that a portion of the second region extends outside of the first region.

6. The airbag device according to claim 1, wherein the second inflatable member is inclined toward the front pillar with a non-perpendicular angle with respect to the first inflatable member.

7. The airbag device according to claim 1, wherein the second inflatable member is inclined toward the front pillar with a non-perpendicular angle with respect to a longitudinal direction of an extension of the first inflatable member.

8. The airbag device according to claim 1, wherein the second inflatable member is folded back such that another part of the second inflatable member extends outside of the first inflatable member.

9. The airbag device according to claim 1, wherein an intersection surface of the first inflatable member with the second inflatable member extends along a bottom surface of the curtain bag body.

10. The airbag device according to claim 1, wherein the curtain bag body includes an intersection inflatable member at an intersection surface of the first inflatable member with the second inflatable member, and
wherein, in a view from the vehicle-width direction, a width of the intersection inflatable member is narrower than a width of the first inflatable member, and a width of the intersection inflatable member is narrower than a width of the second inflatable member.

11. The airbag device according to claim 1, wherein, in the deployed state, the one or more tags includes a first tag disposed in the first region, a second tag disposed in the second region, and a third tag disposed in the second region and disposed more closely to the first tag than the second tag along a periphery of the curtain air bag body in a view from the vehicle-width direction, and wherein, in the inflated state, the second tag is disposed more closely to the first tag than the third tag along the periphery of the curtain air bag body in the view from the vehicle-width direction.

12. The airbag device according to claim 1, wherein, in the overlapping region, the first face of the first region is in contact with the first face of the second region.

13. The airbag device according to claim 1, wherein, in the overlapping region, the second face of the first region is in contact with the second face of the second region.

14. The airbag device according to claim 1, wherein, in the deployed state, the first face of the second region is coplanar with the first face of the first region, and wherein, in the inflated state, the first face of the second region faces the first face of the first region.

15. The airbag device according to claim 1, wherein, in the deployed state, the first face of the second region is coplanar with the first face of the first region, and wherein, in the inflated state, the second face of the second region faces the second face of the first region.

16. An airbag device, comprising:
- a curtain bag body that extends from a front pillar of a vehicle along a roof side rail of the vehicle; and
- one or more tags provided on the curtain bag body, and securing the curtain bag body to the front pillar and the roof side rail,
- wherein the curtain bag body includes a first region including a first inflatable member that is disposed below the roof side rail, and a second region including a second inflatable member that is in communication with the first inflatable member and that is disposed more closely to the front pillar than the first inflatable member,
- wherein the curtain bag body, after installed in the vehicle, is configured to inflate into a folded shape, folded shape including upper edge where the one or more tags are provided and a lower edge opposed to the upper edge in a view from a vehicle-width direction, and the upper edge and the lower edge extend along at least the roof side rail,
- wherein the first region, in the inflated state, is secured to the roof side rail with the one or more tags,
- wherein the second region, in the inflated state, is folded back in such a manner that a part of the second inflatable member overlaps the first inflatable member in the vehicle-width direction of the vehicle and is secured to the front pillar with the one or more tags,
- wherein, in the inflated state, the curtain bag body includes:
  - an overlapping region where the first region and the second region are overlapped in the vehicle-width direction by being folded along a periphery of the curtain bag body in a view from the vehicle-width direction;
  - a first independent region that includes only the first region of the first region and the second region, and that is disposed away from the front pillar more than the overlapping region; and
  - a second independent region that includes only the second region of the first region and the second region, and that is disposed more closely to the front pillar than the overlapping region, the second independent region including a part of the second inflatable member,
- wherein, in the view from the vehicle-width direction, the overlapping region of the curtain bag body in the inflated state includes a periphery,
- wherein the periphery the overlapping region includes a boundary of the first region and the second region that is disposed along the lower edge, and a part of a periphery of the second region, and
- wherein the part of the of the second region extends from the lower edge to the front pillar.

17. The airbag device according to claim 16, wherein the curtain bag body includes an intersection inflatable member at an intersection surface of the first inflatable member with the second inflatable member, and wherein, in the view from the vehicle-width direction, a width of the intersection inflatable member is narrower than a width of the first inflatable member, and a width of the intersection inflatable member is narrower than a width of the second inflatable member.

\* \* \* \* \*